United States Patent Office 3,433,724
Patented Mar. 18, 1969

3,433,724
GRAFTING OF ACRYLONITRILE AND STYRENE ONTO POLYVINYL CHLORIDE USING HIGH ENERGY RADIATION
Adolphe Chapiro, Gif-sur-Yvette, and Anna-Maria Jendrychowska-Bonamour, Issy-les-Moulineaux, France, assignors to Centre Nationale de la Recherche Scientifique, Ministere de l'Education Nationale Republique Francaise, Paris, France, a corporation of France
No Drawing. Filed Apr. 3, 1964, Ser. No. 357,308
Claims priority, application France, June 23, 1963, 939,906
U.S. Cl. 204—159.17      4 Claims
Int. Cl. C08f 1/24, 15/40

ABSTRACT OF THE DISCLOSURE

Process for grafting a mixture of acrylonitrile and styrene onto a polyvinyl chloride backbone wherein the grafter mixture contains 50–99% by volume acrylonitrile, preferably 75–99% by volume acrylonitrile.

---

This invention relates to new and useful improvements in grafted copolymers. The invention more particularly relates to an improved process for obtaining graft copolymers from polyvinyl chloride, styrene and acrylonitrile, using high energy ionizing radiation, and to certain improved polymers produced by this process.

Graft copolymers are polymers having a backbone or trunk of a polymer and a number of side chains or branches of a different polymer.

It is known to produce graft copolymers by irradiating with high energy ionizing radiation an already formed polymer swollen with a polymerizable monomer. The monomer polymerizes as branches or side chains on the already formed polymer, which corresponds to the backbone or trunk. This process is, for example, described in French Patent 1,130,099, filed May 31, 1955.

In accordance with this known process, the polymer, swollen with the monomer, and preferably in the absence of oxygen, as for example under vacuum, is subjected to the high energy ionizing radiation, such as beta rays, gamma rays, neutrons, accelerated electrons, or heavy particles, X-rays, or the like, supplied from a source for such radiation, as for example, an atomic pile, electron, or particle accelerator, radioactive isotope, X-ray equipment, or the like.

It is an object of this invention to provide a particularly favorable polymer-monomer system for this polymerization treatment. This and still further objects will become apparent from the following description:

In accordance with the invention, it has been surprisingly discovered that polyvinyl chloride swollen with a mixture of styrene and acrylonitrile, containing 50–99%, and preferably 95–99% by volume of acrylonitrile, gives particularly favorable grafting results when irradiated with high energy ionizing radiation, preferably under vacuum.

The starting polyvinyl chloride may be any known or conventional polyvinyl chloride having sufficient molecular weight to be considered as a solid under normal conditions. Thus the polyvinyl chloride may preferably have a molecular weight between 25,000 and 75,000, as is conventional for this polymer. This solid polyvinyl chloride polymer may be in any known or desired form, as for example, in the form of a strip, thread, tube, plate, sheet, molded article, or powder.

The swelling of the polyvinyl chloride polymer is effected by simply immersing the same into the mixture of acrylonitrile and styrene containing 50–99%, and preferably 95–99% by volume of acrylonitrile.

The temperature of the immersion is not critical and may be any temperature at which the monomer mixture is liquid, though temperatures of about room temperature or slightly higher, as for example about 50° C., are preferred.

The time of immersion depends on the form of the polymer and the degree of swelling desired, which can readily be observed.

Thus, it is clear that for a given monomer mixture and at a given temperature, it will take longer for the monomers to swell a thick object than a thin film. Moreover, if a small degree of grafting is desired, it may be advantageous to swell the sample to a lesser extent than to the limiting or equilibrium swelling at the particular temperature used. The swelling may be effected at any temperature at which the monomer is liquid.

After the swelling, the excess of the monomer mixture may be removed, if desired, though the irradiation may be effected in the presence of this excess.

The polymer, swollen with the monomer mixture and preferably in the absence of oxygen, such as under vacuum or in an inert atmosphere, is irradiated with high energy ionizing radiation, as for example produced by beta rays, gamma rays, neutrons, accelerated electrons, or heavy particles, X-rays, or the like.

While the irradation is preferably effected in the absence of oxygen, as mentioned above, the same may also be effected in the presence of oxygen, although higher radiation doses will then be required to achieve the same degree of grafting. In order to remove the oxygen, the monomer polymer mixture, either before or after the swelling, may be extensively degassed, as for example with the use of a vacuum pump, or by freezing followed by degassing the frozen mixture, using for example a diffusion pump followed by liquefication, with the cycle being repeated, if desired. While the irradiation may be effected at any desired temperatures, temperatures between about 0 and 60° C. are preferred.

The irradiation is continued until the swollen polymer has received a sufficient dosage to produce the desired degree of grafting, as may be noted by an increase in the weight after drying.

The total doses of radiation necessary to produce this degree of grafting will vary, depending on the dose rates, the temperature, and the particular mixture. Thus, for example, with dose rates of 1000–5000 rads/hr. at 20° C. total doses as low as 1000–5000 rads/hr. at 20° to substantial grafting of 20–50% weight increases when using monomer mixtures containing 50–99% acrylonitrile. When using higher radiation doses, higher total doses may be required to produce the same results, but this is compensated by an increase in production speed.

In all respects, except for the particular polymer-monomer mixture used, the procedure is identical to that conventionally used with graft copolymerization, utilizing high energy ionizing radiation wherein the polymer, swollen with the monomer, is irradiated.

The graft copolymer produced in accordance with the invention has a backbone or trunk corresponding to the polyvinyl chloride and grafter branches comprising an acrylonitrile-styrene copolymer, with the acrylonitrile and styrene units being randomly distributed throughout the polymer chain. Thus, if the vinyl chloride is designated as A, styrene as B, and acrylonitrile as C, the structure of the polymer obtained may be schematically represented by the following formula:

```
—A—A—A—A—A—A—A—A
         |
    B—C—B—B—B—C—C—B—C—B—B
``` in which B and C are distributed at random.

The graft copolymers obtained in accordance with the invention constitute hard, colorless plastics which are soluble in dimethyl formamide and which may be molded when hot to produce molded articles.

Quite surprisingly, when using the particular polymer and monomer mixture combination, a substantially higher degree of grafting for a given radiation dosage is obtained than from other corresponding polymer-monomer combinations, from combinations of polyvinyl chloride swollen with either styrene or acrylonitrile, or mixtures of these components outside of the 50–99%, and preferably 95–99% by volume acrylonitrile containing mixtures.

The following examples are given by way of illustration and not limitation:

Example 1

Eight equal size slips weighing 0.15 gram were cut from a sheet of polyvinyl chloride 0.35 mm. thick, sold under the name Lucoflex by Compagnie Saint-Gobain.

Each of these slips was placed in a Pyrex glass vial containing 10 cc. of a mixture of styrene and acrylonitrile, the composition of this mixture varying from vial to vial.

The eight vials were then degassed by repeating the known cycle of freezing, degassing with a diffusion pump, and liquefaction, three times. The vials were then sealed and allowed to stand for 16 hours at the ambient temperature so as to assure a good swelling of the slips by the mixture of monomers before irradiation.

Each vial was then irradiated by means of a source of cobalt-60 under an intensity of 0.28 rads/sec. at 20° C.

After approximately 20 hours of irradiation the slips were removed from the vials, washed in benzene for 48 hours, dried and weighed.

In Table I below there is listed the composition of the monomer mixture used to swell the slip in each of the vials expressed in percent by volume of acrylonitrile, the time in hours of the irradiation and the degree of grafting expressed in percent of increase of the initial weight:

TABLE I

| Vial | 1 | 2 | 3 | 4 | 5 | 6 | 7 | 8 |
|---|---|---|---|---|---|---|---|---|
| Composition (in percent of acrylonitrile) | 0 | 25 | 50 | 75 | 95 | 97 | 99 | 100 |
| Time (in hours) | 25 | 23 | 20 | 21 | 18 | 11 | 20 | 23 |
| Degree of grafting (in percent) | 35 | 53 | 73 | 117 | 192 | 123 | 138 | 54 |

It is apparent that for comparable doses of irradiation, the degree of grafting is much higher in the case of slips swollen with mixtures of monomers containing 75 and particularly 95% by volume of acrylonitrile than in the case of slips swollen with pure styrene or acrylonitrile, or even by a mixture of these two monomers with a relatively low concentration of acrylonitrile.

By plotting the results it may be seen that substantially improved results are obtained when using a mixture of styrene and acrylonitrile containing from 50 to 99% by volume of acrylonitrile, preferably containing 75–99% by volume of acrylonitrile, and most preferably containing between 95–99% acrylonitrile.

Example 2

Example 1 was repeated except that the irradiation was halted after 10 hours instead of 20. Comparable results were obtained with the degree of grafting substantially increasing as the mixture of monomer contained 50% by volume of acrylonitrile, and sharply falling off as the volume of acrylonitrile exceeded 99%. A substantially higher degree of grafting was obtained using a range between 75–99% by volume of acrylonitrile, and the best results were obtained between 95–99% by volume of acrylonitrile, with the maximum being reached at 97% acrylonitrile.

Example 3

The procedure of Example 1 was repeated with 4 slips placed in 4 vials which were irradiated under an intensity of 1000 rads/hr. In Table II below there is listed the composition of the monomer mixture used to swell the slip in each of the vials, expressed in percent by volume of acrylonitrile, the time in hours of the irradiation, the total dose, the percent weight increase after drying, and the composition of the graft copolymers obtained:

TABLE II

| Percent volume acrylo-nitrile in initial mixture of monomers | Time of irradiation | | Total dose, rads | Percent weight increase after drying | Percent chemical composition | | | |
|---|---|---|---|---|---|---|---|---|
| | Hours | Minutes | | | C | H | N | Cl |
| 50 | 5 | 23 | 5,426 | 23 | 48.9 | 5.4 | 1.2 | 43.1 |
| 50 | 9 | 30 | 9,577 | 34 | 52.5 | 5.4 | 1.7 | 39.5 |
| 75 | 8 | 24 | 8,467 | 47 | 43.5 | 5.5 | 2.2 | 39.5 |
| 90 | 4 | 27 | 4,486 | 24 | 47.4 | 5.3 | 1.2 | 45.8 |

The graft copolymers obtained when using from 50–99% by volume of acrylonitrile in the above examples were hard and colorless plastics which were moldable when hot and which were soluble in dimethylformamide.

While the invention has been described with reference to certain specific embodiments, various changes and modifications which fall within the spirit of the invention and scope of the appended claims will become apparent to the skilled artisan. The invention is only intended to be limited by the appended claims or their equivalents wherein we have endeavored to claim all inherent novelty.

We claim:

1. In the process for producing graft copolymers in which a solid polymer swollen with a monomer is irradiated with a sufficient dosage of high energy ionizing radiation to cause the monomer to polymerize as a graft chain on the polymer, the improvement which comprises utilizing polyvinyl chloride as the polymer, swollen with a mixture of acrylonitrile and styrene containing about 75 to not more than 99% by volume of acrylonitrile as the monomer.

2. Improvement according to claim 1 in which said mixture of acrylonitrile and styrene contains 75–99% by volume of acrylonitrile.

3. Improvement according to claim 1 in which said mixture of acrylonitrile and styrene contains 95–99% by volume of acrylonitrile.

4. Improvement according to claim 1 in which said irradiation is effected with the polymer-monomer mixture degassed under vacuum.

References Cited

UNITED STATES PATENTS 3,180,908  4/1965  Van Essen et al. _____ 260—881
3,188,165  6/1965  Magat et al. _____ 8—115.5

FOREIGN PATENTS 860,348  2/1967  Britain.

OTHER REFERENCES

Sakurada et al.: Grafting with Binary Mixtures of Styrene-Acrylonitrile onto Polyvinyl Alcohol Fiber, Annual Report for the Japanese Association for Radiation Research on Polymers, volume 4, 1962, pp. 85–98.

SAMUEL H. BLECH, *Primary Examiner.*

R. B. TURER, *Assistant Examiner.*

U.S. Cl. X.R.

260—881, 884

UNITED STATES PATENT OFFICE

CERTIFICATE OF CORRECTION

Patent No. 3,433,724

March 18, 1969

Adolphe Chapiro et al.

It is certified that error appears in the above identified patent and that said Letters Patent are hereby corrected as shown below:

Column 2, line 51, "1000-5000 rads/hr at 20°" should read -- 3000 to 20,000 rads will lead --. Column 4, TABLE II, sixth column, line 3 thereof, "43.5" should read -- 53.5 --.

Signed and sealed this 31st day of March 1970.

(SEAL)
Attest:

Edward M. Fletcher, Jr.
Attesting Officer

WILLIAM E. SCHUYLER, JR.
Commissioner of Patents